Oct. 13, 1964  W. R. MILLER, JR., ETAL  3,152,394
MACHINE TOOL
Filed July 26, 1961  9 Sheets-Sheet 1
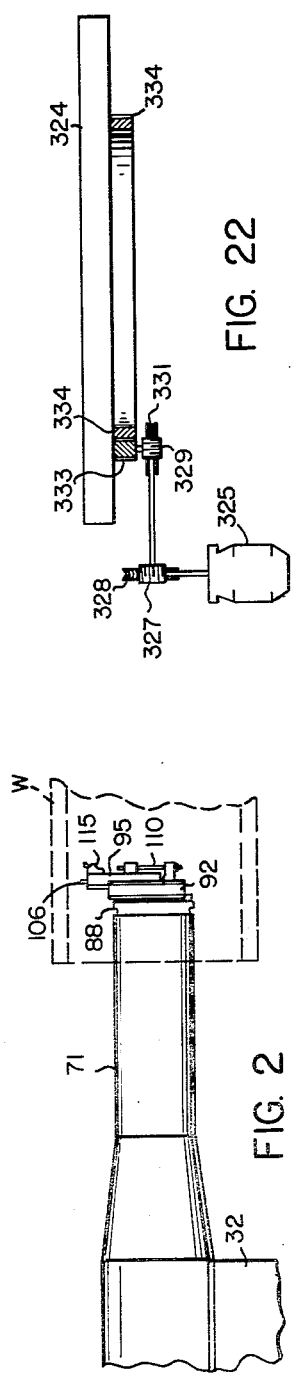
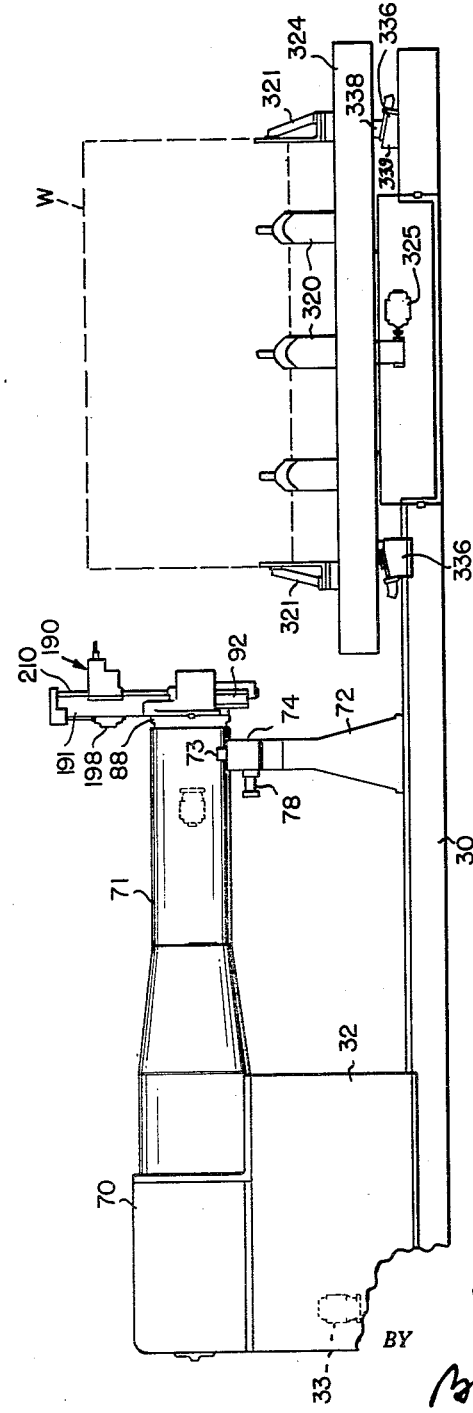
INVENTORS
WILLIAM R. MILLER, JR.
M. D. RYDBERG
JAMES D. SPARKLIN
THEODORE E. FITCH
WORTHY J. FORWARD
BY
Attorney

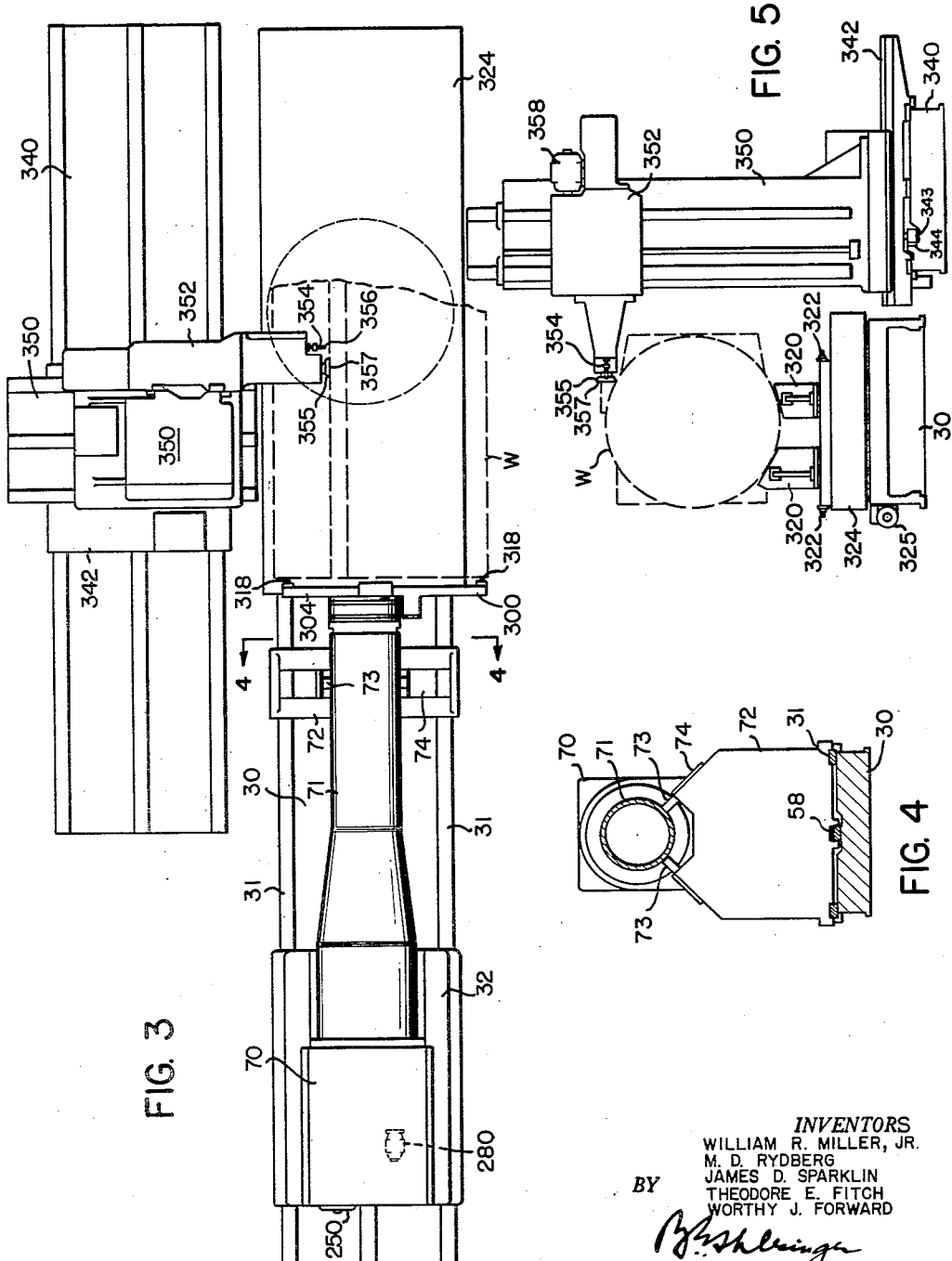

Oct. 13, 1964    W. R. MILLER, JR., ETAL    3,152,394
MACHINE TOOL
Filed July 26, 1961    9 Sheets-Sheet 3
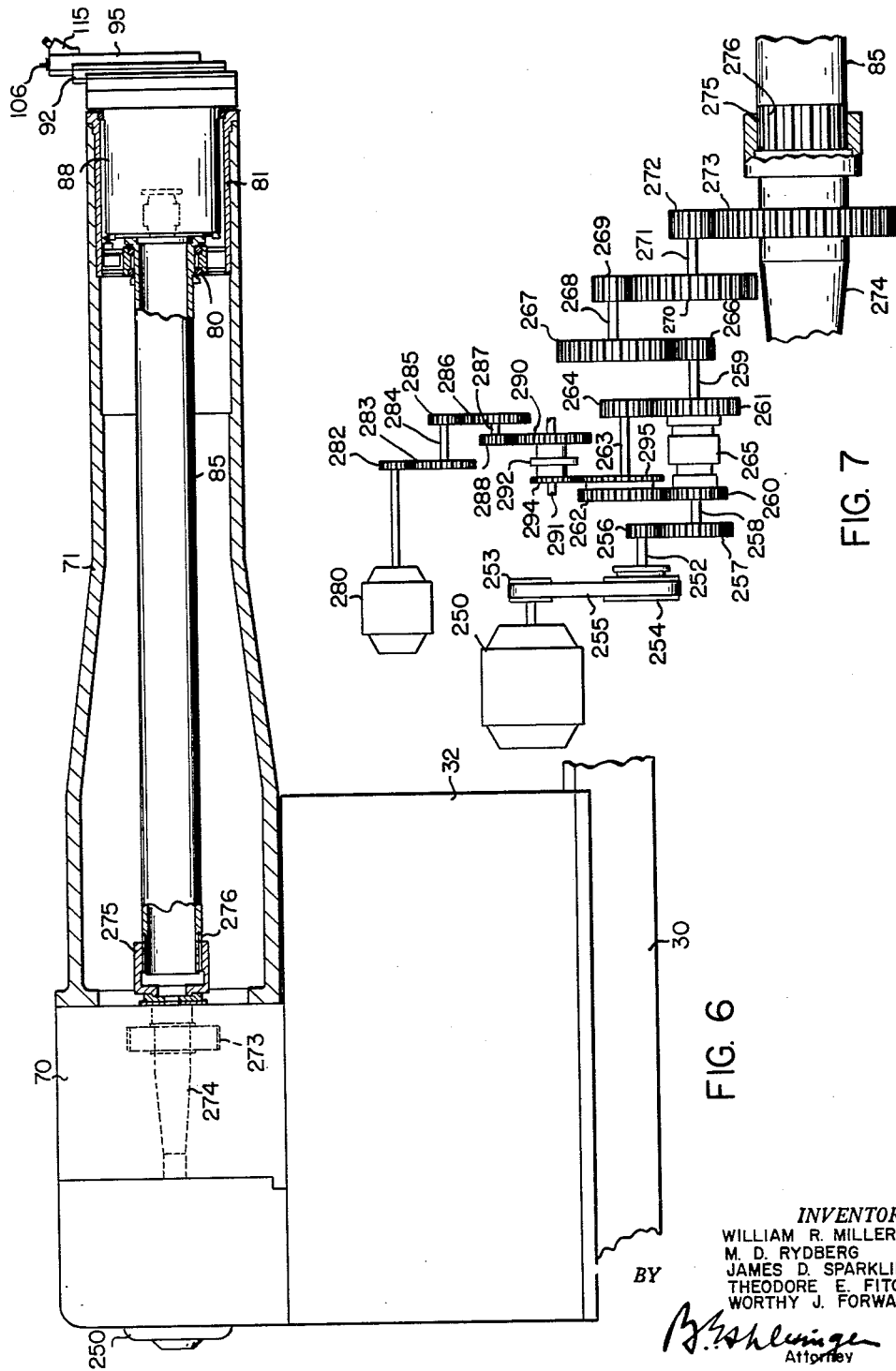
INVENTORS.
WILLIAM R. MILLER, JR.
M. D. RYDBERG
JAMES D. SPARKLIN
THEODORE E. FITCH
WORTHY J. FORWARD
BY
Attorney

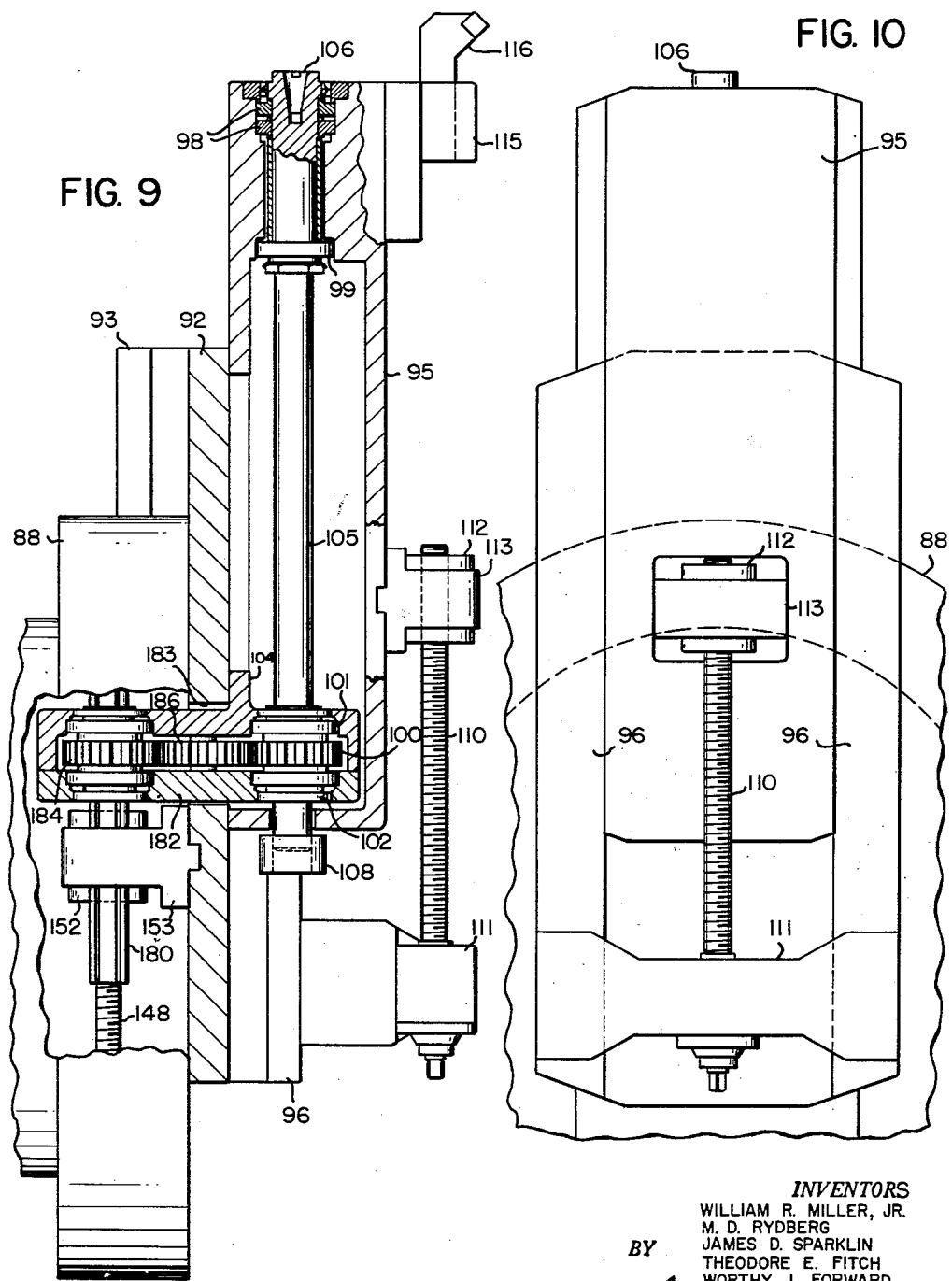

Oct. 13, 1964 W. R. MILLER, JR., ETAL 3,152,394
MACHINE TOOL
Filed July 26, 1961 9 Sheets-Sheet 6

INVENTORS
WILLIAM R. MILLER, JR.
M. D. RYDBERG
JAMES D. SPARKLIN
THEODORE E. FITCH
WORTHY J. FORWARD
BY
Attorney Oct. 13, 1964 W. R. MILLER, JR., ETAL 3,152,394
MACHINE TOOL
Filed July 26, 1961 9 Sheets-Sheet 7

*INVENTORS*
WILLIAM R. MILLER, JR.
M. D. RYDBERG
JAMES D. SPARKLIN
THEODORE E. FITCH
WORTHY J. FORWARD
BY
*Attorney*

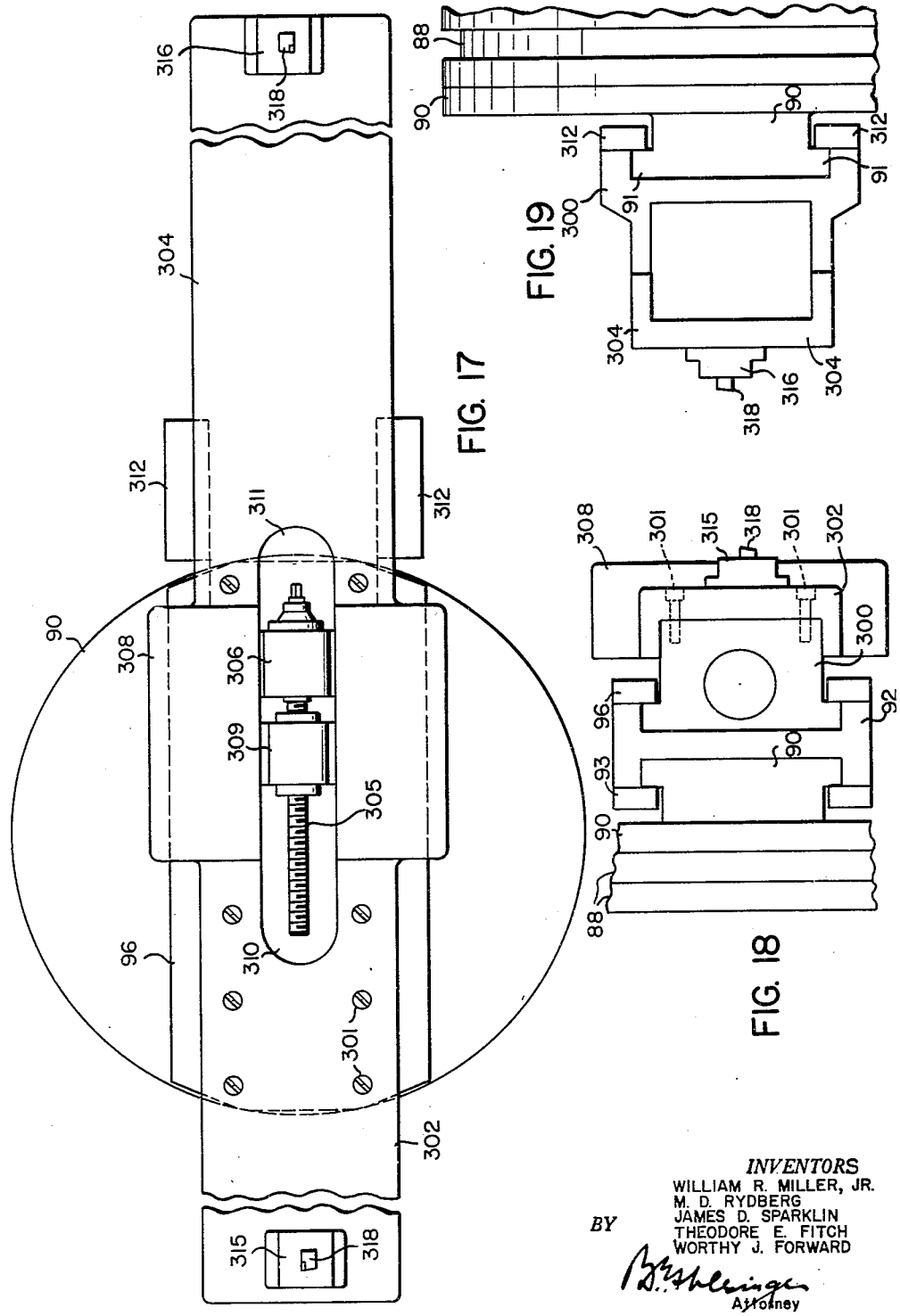

United States Patent Office 3,152,394
Patented Oct. 13, 1964

3,152,394
MACHINE TOOL
William R. Miller, Jr., Brighton, Martin D. Rydberg, Irondequoit, James D. Sparklin, Brighton, Theodore E. Fitch, Pittsford, and Worthy J. Forward, Irondequoit, N.Y., assignors to Consolidated Machine Tool Division of Farrel-Birmingham Company, Inc., Rochester, N.Y., a corporation of Connecticut
Filed July 26, 1961, Ser. No. 128,316
18 Claims. (Cl. 29—560)

The present invention relates to machine tools, particularly to machines for operating on large-sized workpieces, as, for instance, turbine casings, large turbo-generator frames, etc.

For machining turbine casings, large turbo-generator frames, and the like, milling, drilling, tapping and facing operations are all required. The ends of a large generator casing, for instance, must be faced and milled flat to have a smooth finish in order to effect with end covers sealing of the unit, to prevent, for instance, leakage of the hydrogen gas which is used in the unit for keeping the windings cool. The ends of the casing must be drilled and tapped to receive the screws or bolts by which the end covers are secured to the casing. In addition, the generator frames must be bored and very frequently must have slots milled in them like keyways.

Heretofore in boring large-sized workpieces, such as turbine casings, turbo-generator frames, etc. the practice has been to machine the frames or casings on a vertical boring mill with the workpiece supported on end and rotating around a stationary cutting tool. With this method, it is usually necessary for the operator to ride on the table of the machine so he can observe the performance of the cutting tools. This procedure, particularly when the workpiece is large, limits the machining operations to speeds of 75 s.f.p.m. or less. In addition, it prevents the use of carbide tools, and of modern cutting techniques. Furthermore, the drilling and tapping operations have had to be performed on separate machines, which means much handling, several chucking and machining operations and much machine equipment, and this is all very costly.

One object of the present invention is to provide a more efficient machine for machining large workpieces.

Another object of the invention is to provide a machine for boring workpieces, on which other operations, such as face-milling, slotting, drilling and tapping can also be effected.

Another object of the invention is to provide a machine of the character described in which the floor to floor time can be reduced to a minimum.

Another object of the invention is to provide a machine of the character described in which tungsten carbide and similar high-speed cutting tools can be employed.

Another object of the invention is to provide a machine of the character described which is very rigid, and which can be operated at high speed and with extreme accuracy so that its capabilities will be far in excess of prior cutting tool performance.

Still another object of the invention is to provide a machine of the character described which can be set up for operation easily.

Other objects of the invention will be apparent hereinafter from the specification and from the recital of the appended claims, particularly when construed in the light of the accompanying drawings.

In the drawings:

FIG. 1 is a side elevation of a machine built according to one embodiment of this invention, showing the machine set up for drilling and tapping, the workpiece being shown in dotted lines;

FIG. 2 is a fragmentary side elevation showing the machine set up to perform slotting and boring operations, the workpiece being shown fragmentarily and again in dotted lines;

FIG. 3 is a plan view of the machine, showing the machine set up for a facing operation and for drilling and tapping holes in the side of a workpiece, the workpiece again being shown fragmentarily and in dotted lines;

FIG. 4 is a section taken on the line 4—4 of FIG. 3 looking in the direction of the arrows;

FIG. 5 is a view looking from the right hand end of FIG. 3 and illustrating further the mounting for the side drilling and milling tools which may be provided on the machine;

FIG. 6 is a part side elevation, part axial section on an enlarged scale showing the tool spindle assembly of the machine;

FIG. 7 is a diagram of the drive to the tool spindle;

FIG. 9 is a part plan view, part horizontal section, showing the mounting for the boring bar and for the end mill for slotting;

FIG. 10 is a front view further illustrating the mounting for the end mill, the boring bar being removed;

FIG. 17 is a front elevation showing the facing tool carrier mounted on the saddle;

FIG. 18 is a view, similar to FIGS. 11 and 14, and looking from the left in FIG. 17;

FIG. 19 is a view looking from the right in FIG. 17;

FIG. 22 is a diagram of the gearing for rotating the work table.

Figure 8:
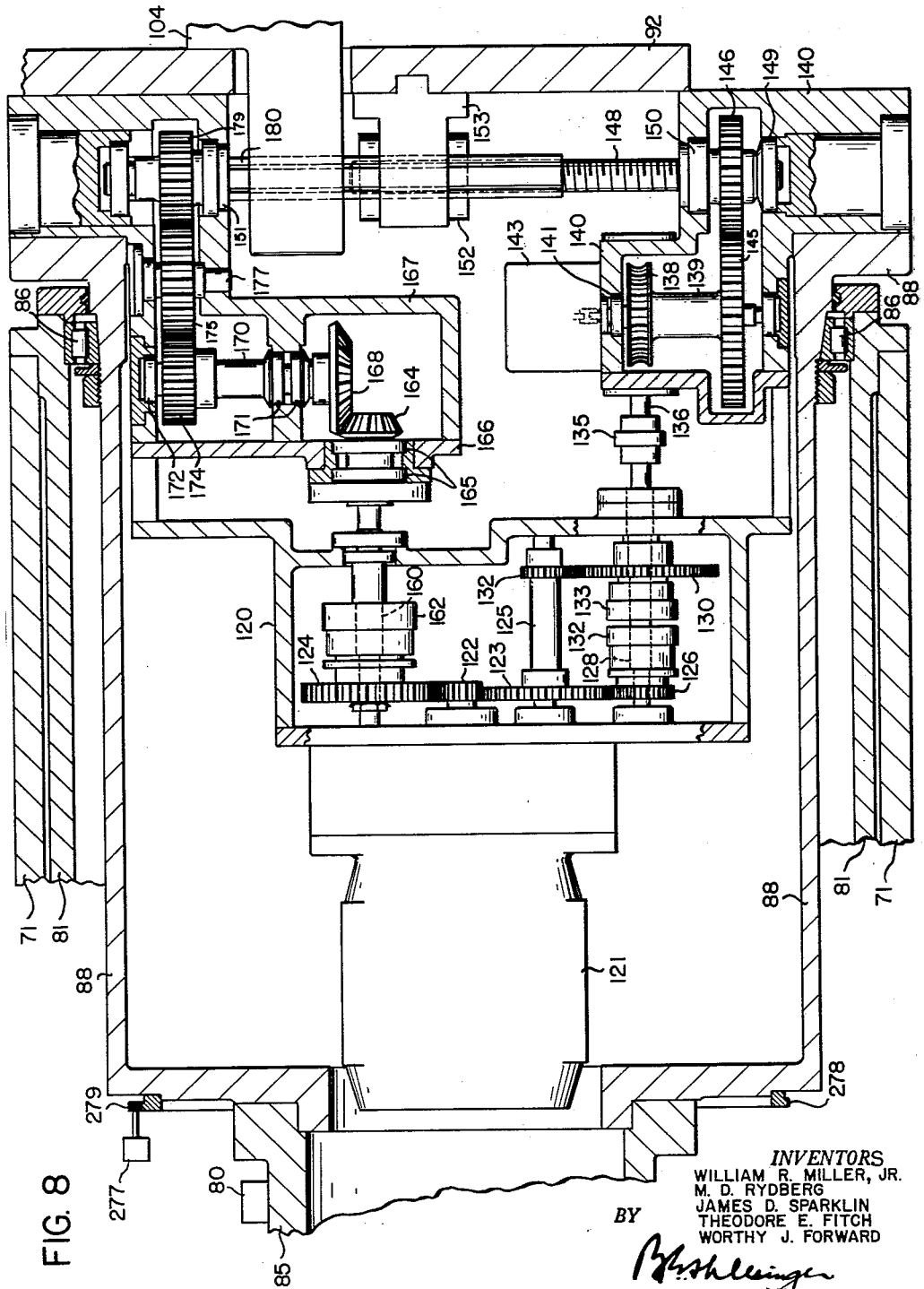
FIG. 8 is an axial sectional view on a considerably enlarged scale taken through the tool spindle and showing the drive to the slide on which the boring bar and face milling tools may be carried.

In the embodiment of the invention illustrated in the drawings the workpiece is mounted on supports which are carried on a work table that is rotatably adjustable about a vertical axis through 360°. The tool or tools used in a particular machining operation are supported from a saddle which is movable horizontally on the bed of the machine. Movement of the saddle is effected by a motor and suitable gearing. The saddle carries a horizontally projecting tubular housing in which a tool spindle is journaled. This spindle carries within the tubular housing a cup-shaped support. This support is secured to the spindle to rotate therewith. The front face of the support is formed with a guideway on which there can be mounted for reciprocation, in a direction at right angles to the axis of the spindle, slides which serve to carry different tools.

For a boring operation, or for milling internal slots in the workpiece, the slide, which is mounted on the guideway, has a second slide mounted thereon for adjustment rectilinearly in a direction parallel to the direction of reciprocation of the first-named slide. A boring tool can be removably mounted on this second slide; and journaled in the second slide is a tool shaft which extends in the direction of adjustment of the second slide and on which an end mill can be chucked.

For boring the workpiece, a boring tool is secured on the second slide, the second slide is adjusted rectilinearly on the first slide to position the boring tool at the required radial distance from the axis of the tool spindle to bore the workpiece to the desired diameter, and the tool spindle and the cup-shaped support are rotated together about the axis of the tool spindle while the saddle is moved on the bed axially of this spindle. An outboard support is provided to support the projecting portion of the spindle housing. This support is frictionally clamped to the spindle housing and slides on the machine bed as the saddle is moved forwardly or rearwardly. The tool spindle is driven through suitable gearing from a motor, which is carried by the saddle. Adjustment of the second slide on the first is effected manually by adjustment of a screw which is journaled at one end on the first slide and which threads at its other end into a nut which is secured to the second slide.

For milling slots axially in the bore of the workpiece, the boring tool is removed from the second slide, and a milling cutter is chucked on the tool shaft. The tool shaft and milling cutter are driven from a motor, which is mounted in the cup-shaped support, and which is connected through suitable gearing to the tool shaft. To mill a slot at the desired diameter in accordance with the bore diameter of the workpiece and to the correct depth, the second slide is adjusted rectilinearly, as for boring, on the first slide to position the milling cutter at the required radial distance from the axis of the tool spindle. During milling of a slot, the saddle is moved on the machine bed to cut the slot along its full length. For cutting different slots at different angular positions around the bore of the workpiece, the tool spindle has to be indexed to locate the milling cutter at the required angular positions with relation to the workpiece. Indexing is effected by a motor mounted in the spindle housing and connected with the tool spindle partly through gearing which is provided for effecting continuous drive of the tool spindle and partly through additional gearing. Clutches serve to control connection and disconnection of the indexing and continuous tool spindle drives.

For drilling holes in an end face of the workpiece the boring tool and milling cutter are removed, and an arm is secured on the face of the cup-shaped support which carries a slide that supports a drill spindle on which a drill can be mounted. The drill spindle is mounted to extend forwardly from the cup-shaped support in the direction of the common axis of the tool spindle and cup-shaped support. The drill spindle is journaled on a slide which is mounted for adjustment on the arm radially of the axis of the tool spindle to position the drill at the radial position required to drill holes at the desired radial distance from the axis of the bore of the workpiece. A motor, which is mounted on the arm, that carries the drill spindle, effects adjustment of the slide through gearing and a screw and nut. The drill spindle itself is driven from the motor in the cup-shaped support through a train of gearing including a long-faced pinion which permits depthwise feed of the drill to drill or tap a hole to proper depth. Feed of the drill into and out of depth is effected by fluid-pressure through a piston and cylinder. For drilling holes at different angular positions around the workpiece, indexing is effected in the same way as for milling different slots in the workpiece.

For facing the workpiece, the second slide and the boring tool, milling tool, and drill supports are removed, and a third slide is mounted on the first slide. This third slide is made in two parts which are adjustable rectilinearly relative to one another at right angles to the axis of the tool spindle. Each part carries at its radially outer extremity a facing tool. For facing the tool spindle is revolved while the first slide is being moved. Thus while the two facing tools move rectilinearly at diametrally opposite points across an end face of the workpiece they will simultaneously be revolved about the axis of the tool spindle which coincides with the axis of the workpiece.

The work table is adjusted through 180° to position it for drilling, tapping, and facing opposite ends of the workpiece.

In the machine illustrated there is a column disposed at one side of the bed. This column is mounted on a slide for adjustment laterally, toward and from the work support. This slide itself is mounted for adjustment in a direction parallel to the direction of adjustment of the tool saddle on the bed. A saddle is mounted on the column for vertical adjustment thereon. This saddle carries two tool spindles, one of which is adapted to carry a milling cutter; and the other of which is adapted to carry a tap or drill. These tools are for drilling, tapping or milling side surfaces of a workpiece. The column, its mounting and its associated parts form no portion, however, of the present invention.

Figure 21:
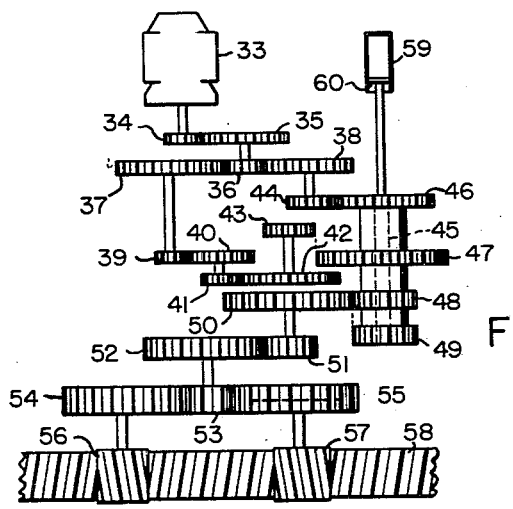
FIG. 21 is a diagram of the gearing for effecting feed and traverse of the saddle.

Referring now to the drawings by numerals of reference, 30 denotes the bed of the machine. Slidably mounted on ways 31 formed on the upper face of the bed is a saddle 32 (FIGS. 1 and 3), which is adapted to be moved along the ways 31 by gearing, such as illustrated in FIG. 21, driven from a motor 33 (FIGS. 1 and 21) housed in the saddle.

This gearing is of conventional type and comprises a pinion 34 (FIG. 21) mounted on the armature shaft of the motor, and meshing with a gear 35 which is secured to the same shaft as pinion 36. Pinion 36 meshes with two gears 37 and 38. Gear 37 is on a shaft which carries a pinion 39 that meshes with a gear 40 which is secured to the same shaft as pinion 41. Pinion 41 meshes with a gear 42 on a shaft that carries a pinion 43. Gear 38 is on the same shaft as pinion 44. Mounted on an axially reciprocable shaft 45 are gears 46 and 47 and pinions 48 and 49. In the position shown in FIG. 21, which is the position when the saddle is being traversed at high speed, pinion 44 meshes with gear 46; and shaft 45 drives gear 50 through pinion 48. Gear 50 drives the saddle through pinion 51, gear 52, pinion 53, the two gears 54 and 55, which mesh with pinion 53 at diametrically opposite sides thereof, pinions 56 and 57, which are secured to the same shafts as gears 54 and 55, respectively, and rack 58 which is secured to the saddle. The shaft 45 is movable axially by a fluid pressure operated mechanism comprising a cylinder 59, and a piston 60, which is reciprocable in the cylinder and which is connected to the shaft 45 to effect axial movement thereof. When the shaft 45 is moved upwardly from the position shown in FIG. 21 to shift gear 46 out of engagement with pinion 44, and to shift pinion 48 out of engagement with gear 50, and to bring gear 47 into engagement with gear 43, and pinion 49 into engagement with gear 50, the drive to the saddle is from pinion 43 through gear 47, pinion 49, gear 50 and thence to the drive pinions 56 and 57 and rack 58. This is the slow feed drive for the saddle used in boring, etc. The direction of application of fluid pressure to piston 60 may be controlled by a manually-operable valve (not shown) mounted at a convenient location in the machine.

Figure 16:
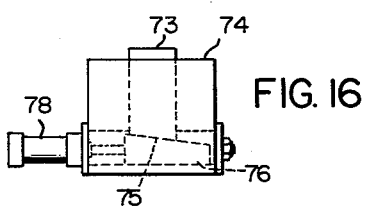
FIG. 16 is a detail view of the means for supporting the spindle housing.

Mounted upon the top of the saddle is a housing 70 (FIGS. 1 and 2) to the front face of which there is secured a tubular housing 71, which projects forwardly beyond the front end of the saddle 2. The forward end of the tubular housing 71 is supported by an outboard support 72, which carries two blocks 73 (FIGS. 1, 4 and 16) that are mounted to reciprocate in casings 74 that are fastened on the opposite, upper inclined sides of support 72 to be moved into and out of engagement with the outside wall of the tubular housing 71. When in their upper positions, blocks 73 engage the underside of the housing at spaced points to support the housing against deflection. The blocks 73 are moved to and from operative position by fluid pressure. Each block has an inclined bottom surface 75 (FIG. 16) which is engaged by the upper inclined surface of a wedge member 76. The wedge members are reciprocable in the respective associated casings 74 by pistons (not shown) that are reciprocable in cylinders 78 which are secured to the respective casings. Each wedge member is connected to the associated piston. The direction of movement of the pistons is controlled by a conventional manually-operable valve (not shown); and the two wedges are moved together selectively in one or the other direction to move the rods 73 together to or from operative positions.

The support 72, like the saddle 32, is movable on the ways 31 of the bed. When the blocks 73 are in engaging position they grip the periphery of housing 71 with sufficient friction to be moved along the ways 31 when the saddle moves along these ways carrying the housing 71 with it.

Figure 11:
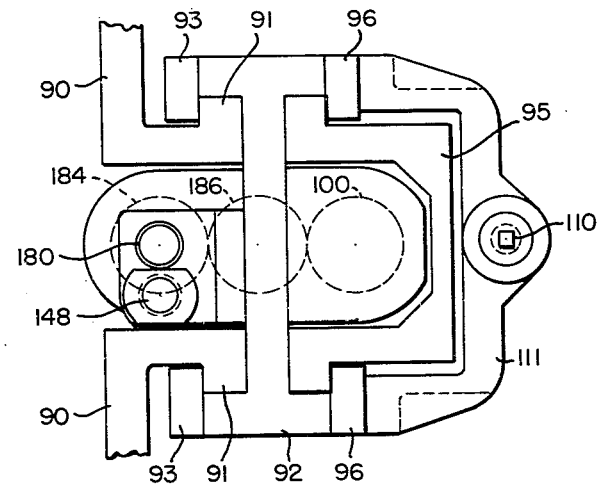
FIG. 11 is an end view on an enlarged scale showing how the slide is mounted on the saddle.

Journaled on anti-friction bearings 80 (FIG. 6) in a sleeve 81, that is secured at its front end to the front end of housing 71, is a spindle 85. Secured to the forward end of this spindle and journaled on anti-friction bearings 86 (FIG. 8) within the sleeve 81 is a generally cup-shaped member 88. The front face of member 88 is formed with portions 90 (FIG. 11) which provide diametrically extending guide ways 91, on which there may be mounted a slide 92 (FIGS. 11 and 14) that is held on the ways 91 by gibs 93. A slide 95 may be mounted to slide on the slide 92. It is secured thereon by gibs 96.

Journaled in the slide 95 on anti-friction bearings 98 and 99 (FIG. 9) and in the hub of a gear 100, is a shaft 105. Gear 100 is journaled on anti-friction bearings 101 and 102 in a bracket 104, secured to slide 92. Shaft 105 is counterbored at its outer end, as denoted at 106, to receive the shank of an end mill. The other end of this shaft has a coupling 108 for connection to a drill unit as will be described further hereinafter.

Removably secured to the front face of slide 95 is a tool holder 115 which is adapted to carry a conventional boring tool 116. The tool holder 115 is removed in FIG. 13.

The slide 95 is adjustable manually by means of a screw 110 (FIGS. 12 and 13) which is journaled at one end in a yoke member 111, and which threads at its other end into a nut 112 that is carried by a yoke 113 which is keyed to the slide 95. The yoke 111 is adapted to be bolted to the gibs 96. The slide 95 is adjusted in accordance with the internal diameter of the workpiece. This adjustment determines the position of the boring tool 116 or of the end mill, which is mounted on spindle 105, radially of the axis of tool spindle 85 (FIG. 6), thereby determining the bore diameter of the bore of the workpiece if the boring tool is used, or the depth of the grooves or splines to be milled in this bore when an end mill is employed.

Mounted in the cup-shaped member 88 (FIG. 8), and rigidly secured thereto, is a support 120 to which there is fastened a reversible motor 121. The armature shaft of this motor carries a pinion 122 which meshes with and drives two gears 123 and 124. The gear 123 is secured to a shaft 125, which is journaled at opposite ends in the bracket 120. The gear 123 meshes with a pinion 126 which is journaled on anti-friction bearings on a shaft 128. Journaled on the shaft 128 by anti-friction bearings is a gear 130. A pinion 132, which is secured to the shaft 125, meshes with the gear 130. Solenoid operated disc clutches 132 and 133 serve to connect the pinion 126 and the gear 130 selectively to the shaft 128. When the pinion 126 is connected to the shaft 128, the shaft 128 is driven at high speed from the pinion 122 through the gear 123 and pinion 126. When the gear 130 is coupled to the shaft 128, the shaft 128 is driven at low speed from the pinion 122 through the gear 123, the shaft 125, the pinion 132 and the gear 130. Thus, by selectively actuating the clutches 132 and 133, the shaft 128 can be driven selectively at two different speeds.

The shaft 128 is connected by a conventional coupling 135 with a worm shaft 136 which carries a worm that meshes with a worm wheel 138 that is fastened to a shaft 139. The shaft 139 is journaled at opposite ends on anti-friction bearings in a bracket 140 that is rigidly secured to bracket 88. Coupled to the shaft 139 by a coupling 141 is a pulse generator 143, the purpose of which will be described later.

Secured to the shaft 139, also, is a gear 145, which meshes with a pinion 146 that is fastened to the shaft 148. This shaft is journaled at one end on anti-friction bearings 149, 150 in bracket 140. It is threaded, and threads into a nut 152 (FIG. 12) that is carried by a yoke 153 keyed to the slide 92.

The gear 124 (FIG. 8), already referred to, is journaled by means of anti-friction bearings on a shaft 160, and is adapted to be coupled to that shaft by a solenoid operated disc clutch 162. The shaft 160 has splined engagement with a bevel pinion 164 whose hub is journaled on anti-friction bearings 165 in the cover plate 166 of a bracket 167. The bevel pinion 164 meshes with a bevel gear 168 that is keyed to a shaft 170. This shaft is journaled on anti-friction bearings 171 and 172 in the bracket 167. It has a spur gear 174 keyed to it, which meshes with a spur gear 175 that is journaled on a stud shaft 177, which is carried by the bracket 167. The gear 175 meshes with a gear 179 which is mounted on a splined shaft 180 (FIGS. 8 and 9).

The shaft 180 is journaled on anti-friction bearings in the bracket 104 (FIG. 8) and in the cover plate 182 (FIG. 9) for this bracket. Bracket 104 and plate 182 extend through a slot 183 of slide 92. Shaft 180 has a spur gear 184 keyed to it which meshes with a spur gear 186 that is mounted on a stud shaft carried by the bracket 104 and cover plate 182. This gear in turn meshes with the gear 100, which is secured to the milling spindle 105 to drive that spindle.

Figure 12:
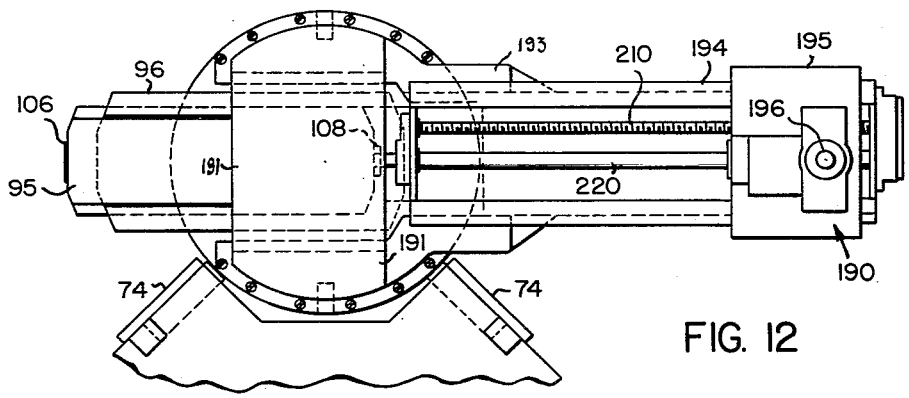
FIG. 12 is a fragmentary front elevation showing particularly the mounting of the portable drill on the tool slide.
Figure 13:
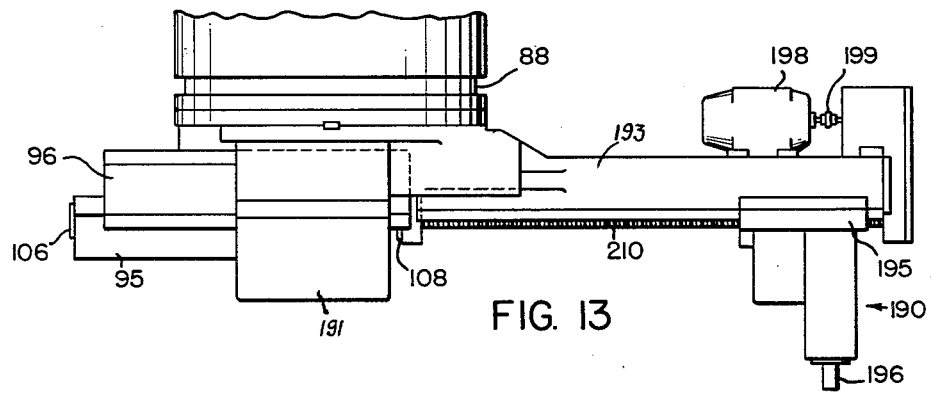
FIG. 13 is a plan view, similar to FIG. 9, but on a smaller scale, further illustrating this mounting.

For drilling holes in an end face of the workpiece, the removable and portable unit designated as a whole at 190 (FIGS. 11, 12 and 15), is provided. This unit is carried by a support or bridge member 191 (FIG. 14) which is adapted to be removably bolted to a ring member 192 which in turn is removably bolted to guide plate 90. Guide plate 90 is, as already described, bolted to the front face of the cup-shaped member 88. Secured to the bridge 191 to project laterally therefrom is an arm 193 (FIGS. 12 and 13). Slidably mounted on guideways 194 on the arm 193 is a support 195 (FIGS. 8 and 9) for a spindle 196 (FIGS. 12, 13, and 15) to which may be secured a drilling tool or a tap.

Figure 20:
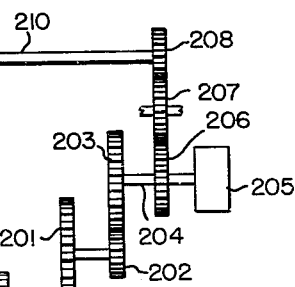
FIG. 20 is a diagram of the gearing for positioning the portable drill unit.

The slide 195, which carries the drilling tool, is adapted to be positioned by a motor 198 (FIGS. 13 and 20), the armature shaft of which is coupled by a coupling 199 and spur gearing 200, 201, 202 and 203 (FIG. 20), and shaft 204 with a conventional pulse generator 205. The shaft 204 drives through the spur gearing 206, 207, 208 the screw shaft 210 (FIGS. 12, 13 and 20) which threads into a nut in the drilling tool support 195. The drill shaft 196 itself is journaled on anti-friction bearings 211 and 212 (FIG. 15) in a sleeve 213 that is axially slidable in a bracket 214 that is bolted or otherwise secured to slide 195. When the drill holder is in operative position, a splined shaft 220 mounted thereon is aligned axially with shaft 105 (FIG. 9), and is coupled to shaft 105 so that the drill spindle 196 is driven from the shaft 105 (FIG. 9) through the coupling 108 through the gear train described below.

In FIGS. 12 and 13 the cup-shaped member 88 and the tool spindle 85 are shown revolved through 180° from the position shown in FIG. 9 so that the arbor 106 for holding a milling cutter is shown at the left in FIGS. 12 and 13, where as it is shown at the right in FIG. 9, and vice versa, the coupling 108 is at the right hand end of slide 95 in FIG. 12 whereas it is shown at the left hand end of the slide in FIG. 9. Boring tool 116 and its holder 115 are, of course removed from slide 95 when the machine is set up for drilling a hole in the end of a workpiece.

The coupling 108 connects the shaft 105 with a splined shaft 220, which is journaled on anti-friction bearings 221 and 222 (FIG. 15) in slide 195. Shaft 220 has a sliding splined connection with a bevel mitre gear 224 that meshes with a bevel mitre gear 225. The bevel mitre gear 225 is secured to a stud shaft 226, with which there is integral a spur pinion 228. Shaft 226 is journaled on anti-friction bearings 230 and 231 in the support 214. The spur gear 228 meshes with a wide-faced spur pinion 233, which is integral with a shaft that is journaled on anti-friction bearings 234 and 235 in the bracket 214. The spur pinion 233 meshes with a spur gear 236 which is fastened to the drill spindle 196.

Feed of the drill into the work is effected hydraulically from the cylinder 240, in which there reciprocates a piston (not shown) having a piston rod 241 extending outwardly beyond one end of the cylinder. To this piston rod is secured a plate 242 which engages behind a plate 243 which is secured to the rear end of the sleeve 213 in which the drill spindle 196 is journaled.

For effecting the boring operation, a motor 250 (FIGS. 6 and 7) is provided. This motor is mounted upon the upright or housing 70. It drives a shaft 252 (FIG. 7) through the pulleys 253 and 254 and the connecting belt 255. The shaft 252 has a spur pinion 256 secured to it which drives a spur gear 257 that is fastened to a shaft 258. Mounted in axial alignment with shaft 258 is a shaft 259. Journaled on the shaft 258 is a spur pinion 260; and secured to the shaft 259 is a spur gear 261. Gear 260 meshes with a spur gear 262 secured to a shaft 263. Gear 261 meshes with a spur pinion 264 also secured to shaft 263. The shaft 258 can be selectively connected to the spur gears 260, 261, respectively, by a sliding clutch 265. When clutch 265 is engaged with gear 260, shaft 259 is driven at high speed from shaft 258 through gears 260, 262, shaft 263, and gears 264, 261. When clutch 265 is engaged with gear 261, shaft 258 drives shaft 259 directly at low speed. The shaft 259 carries a spur pinion 266 which meshes with a spur gear 267 that is secured to a shaft 268. This shaft also carries a spur pinion 269 that meshes with a spur gear 270 on a shaft 271. The shaft 271 has secured to it a spur pinion 272 which meshes with a spur gear 273 (FIG. 6) that is fastened to a shaft 274 that is journaled in upright 70 and that is connected by a coupling, comprising an internal gear 275 and an externally toothed coupling member 276, with the axially-aligned tool spindle 85.

A conventional pulse generator 277 (FIG. 8) is actuated upon rotation of carrier 88. This pulse generator is driven from the carrier through a spur gear 278, which is fastened to the carrier and a spur pinion 279, which meshes with gear 278 and which is secured to the armature shaft of the generator.

For milling splined slots in the bore of a workpiece at different angular positions around the axis of the bore, the milling cutter must be indexed. For this purpose a motor 280 (FIG. 7) is provided. The armature shaft of this motor carries a pinion 282 which meshes with a gear 283 that is fastened to a shaft 284. This same shaft has a spur pinion 285 fastened to it which meshes with a spur gear 286 that is fastened to a shaft 287. The shaft 287 has a spur pinion 288 fastened to it which meshes with a spur gear 290. The spur gear 290 is rotatably mounted on a shaft 291. Mounted on this same shaft 291 is a spur gear 294. The gear 294 meshes with a gear 295, which is integral with or secured to the gear 262. The gear 290 can be clutched to the shaft 291, to be driven from this shaft, by a shiftable splined clutch 292. When the clutch 292 is engaged with the gear 294, and the clutch 265 is also engaged with the gear 261, the shaft 259 will be driven from the motor 280 through the gearing 282, 283, 285, 286, 288, 290, 294, 295, 264, 261 to index the spindle 85.

For facing, the slide 95 and all the parts supported thereby are removed from the machine and a slide 300 (FIGS. 17, 18 and 19) is substituted. Secured to this slide by bolts or screws 301 is an elongate plate 302, on which there is mounted for lateral adjustment relative to the slide 302 a facing tool arm. Arm 304 is adjusted relative to plate 302 by a manually-rotatable screw 305. Screw 305 is journaled in a bearing member 306 which is secured to a bridging member 308 that is integral with arm 304; and screw 305 threads into a nut 309 that is fastened to plate 302. An elongate slot 310 in slide 302 and an aligned elongate slot 311 in arm 304 permit the adjustment. Slide 300 has gibs 312 secured to it at its extreme right hand end, as viewed in FIG. 17, which engage the ways 91 of guide 90 when the slide 302 is adjusted out to its extreme left hand position as viewed in this figure, thereby to hold and guide the slide 300 on the guide 90.

The slide 300 and the arm 304 carry adjacent their extremities blocks 315 and 316, respectively, on which are mounted conventional facing tools 318.

In the facing operation the workpiece is stationary while the facing tools are moved across its end surface by operation of slide 90 and while the tools are simultaneously revolved through rotation of spindle 85.

The work piece W, which is to be drilled, tapped, bored and milled, is adapted to be supported on rests or brackets 320 (FIGS. 1 and 5), which have inclined upper faces. The brackets are mounted in pairs in lateral alignment. Two such brackets 320 together can form as shown in FIG. 5, a generally V-shaped support in which the peripheral surface of the workpiece can rest. Other, similar brackets 321 may be secured to the table to prevent endwise movement of the workpiece after it has been lowered onto the rests or brackets 320. The rests or brackets 320 can be moved toward and from one another by screws 322, which are journaled on the table 324 of the work machine, and which thread into nuts (not shown) which are secured to the brackets.

The table 324 is mounted to be indexed about a vertical axis. For this purpose a motor 325 (FIGS. 1 and 22) is provided. The armature shaft of this motor is connected to a worm 327 which meshes with a worm wheel 328 that is secured to a shaft 329 to which is fastened a worm 330 that meshes with a wormwheel 331. Wormwheel 331 is secured to a vertical shaft to the upper end of which there is secured a pinion 333 which meshes with a spur gear 334. Gear 334 is fastened to the table 324. For indexing the table, conventional hydraulically operated table supports 336 may be moved to lift table 324 a few thousandths of an inch so that it will rotate freely during indexing. After indexing of the table is completed, the supports 336 are returned to their lowered positions where the table is held against rotation. The supports 336 comprise blocks 338 which are slidable on inclined ways on the bases 339. The movement of the blocks 338 is effected hydraulically under control of a conventional manually-operable valve (not shown).

In some instances, it may be desirable to mill and drill pads or other side surfaces on the workpiece. For this purpose, at one side of the bed of the machine there is mounted a bed plate 340 (FIGS. 3 and 5), on which a carriage 342 is supported for longitudinal adjustment. Adjustment of the carriage is adapted to be effected by rotation of a pinion 343 which meshes with a rack 344 that is secured to the bed plate. Mounted on the carriage 342 to be adjustable transversely thereof is column 350. Mounted upon this column is a saddle 352 for both a drill spindle 354 and a milling cutter spindle 355. The spindles are adapted to be driven by a motor 358 which is secured on the saddle 352 and which is geared to both spindles.

The machine is of large size. In one embodiment it is 97 ft. long and 37 ft. overall wide and 28 ft. in height above the level of the floor. The bed may be mounted on concrete in a recess in the floor.

The operation of the machine will be understood from the preceding description, but may be briefly summed up here.

To machine a workpiece W, the workpiece is placed on the supporting blocks or rests 320 (FIG. 5) and aligned blocks are adjusted toward or away from one another to align the axis of the workpiece with the common axis of the tool spindle 85 (FIG. 6) and of cup-shaped member 88. A surveyor's instrument may be used for this purpose to attain the desired accuracy.

Suppose it is desired to bore the workpiece, the machine is set up as shown in FIGS. 2, 6 and 9. The boring tool is adjusted to the required radius by rotating screw 110 (FIG. 9) manually. This adjusts slide 95 on slide 92. The saddle 32 (FIGS. 1 and 6) is moved on bed 30 to bring the boring tool into operative relation with the workpiece by motor 33 and the gearing driven thereby and shown in FIG. 21. When the boring tool 115 is in operative relation to the workpiece, the motor 250 (FIGS. 6 and 7) is started to cause the tool spindle 85 to revolve through the gear train shown in FIG. 7 and previously described. Thereby the boring tool 115 is revolved about the axis of the tool spindle. Simultaneously the boring tool will be moved axially of the workpiece by feed of the saddle 32 through operation of the motor 33 (FIGS. 1 and 21) and of the gear train driven thereby as previously described. When the boring operation is complete, the boring tool can be backed away from the workpiece by manipulation of screw 110 (FIG. 9) and can be withdrawn axially from the workpiece by traverse of the saddle 32 back to its starting position by reversal of motor 33 and shifting shaft 45 to the position shown in FIG. 21 to engage direct high speed traverse drive of the saddle 32 (FIG. 6).

For milling slots in the workpiece, the boring tool block 115 (FIG. 9) and the boring tool 116 will be removed from the machine, and an end mill will be chucked on spindle 105. Again the slide 95 will be adjusted on slide 92 by manual adjustment of screw 110 to set the milling cutter for radius and desired depth of cut. Again the saddle will be operated by motor 33 (FIGS. 1 and 21) to bring the tool into operative relation with the workpiece. The spindle 105, which carries the milling cutter, will be rotated from motor 121 (FIG. 8) through the gear train 122, 124, 164, 168, 174, 175, 179, (FIG. 8), 184, 186, 100 (FIG. 9), and again feed will simultaneously be imparted to saddle 32 to move the tool in the direction of the work axis so that the tool mills a slot in the bore wall of the workpiece. This time, however, tool spindle 85 will be stationary. After a slot has been milled for its full length the milling cutter may be backed off from the workpiece by screw 110 (FIG. 9) and as before the saddle 32 may be quickly traversed back until the milling cutter has returned to the starting position for milling. The tool spindle 85 (FIG. 6) is now indexed to move the tool angularly about the axis of the tool spindle to the position required for milling a new slot in the workpiece. Indexing is effected through motor 280 (FIG. 7) and the gear train driven thereby when clutch 292 couples gear 294 to shaft 291 and clutch 265 couples gear 261 to shaft 269 as previously described. When the milling cutter has been rotated angularly about the axis of tool spindle 85 through the angle required to bring it into position to mill the next slot in the workpiece, the motor 280 will be stopped, motor 121 (FIG. 8) will be restarted if it has been stopped, to again drive the milling cutter, and shaft 45 (FIG. 21) will be shifted to initiate again the slow feed movement of saddle 32. Thus another slot will be milled in the work as before. To insure accuracy of the indexing of spindle 85, pulse generator 277 (FIG. 8) is provided. It is actuated as spindle 85 and cup-shaped support 88 are rotated for indexing. The number of pulses generated during a given angular movement of the spindle 85 is a measure of the angle through which the spindle is moved, and can be used through any suitable conventional mechanism, such as a tape, to stop the indexing rotation when the spindle 85 has been indexed through the desired angle.

Figure 14:
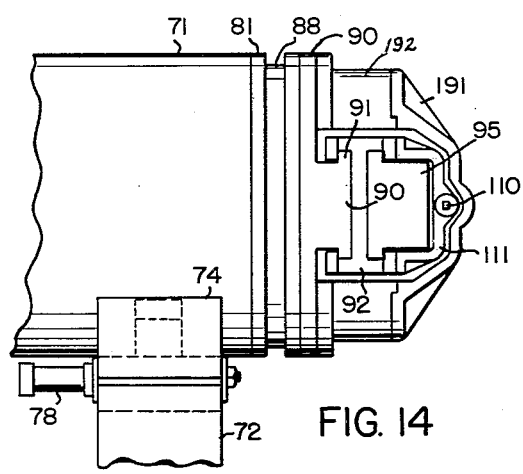
FIG. 14 is a fragmentary side view, similar to FIG. 11 but on a smaller scale, further showing this mounting.
Figure 15:
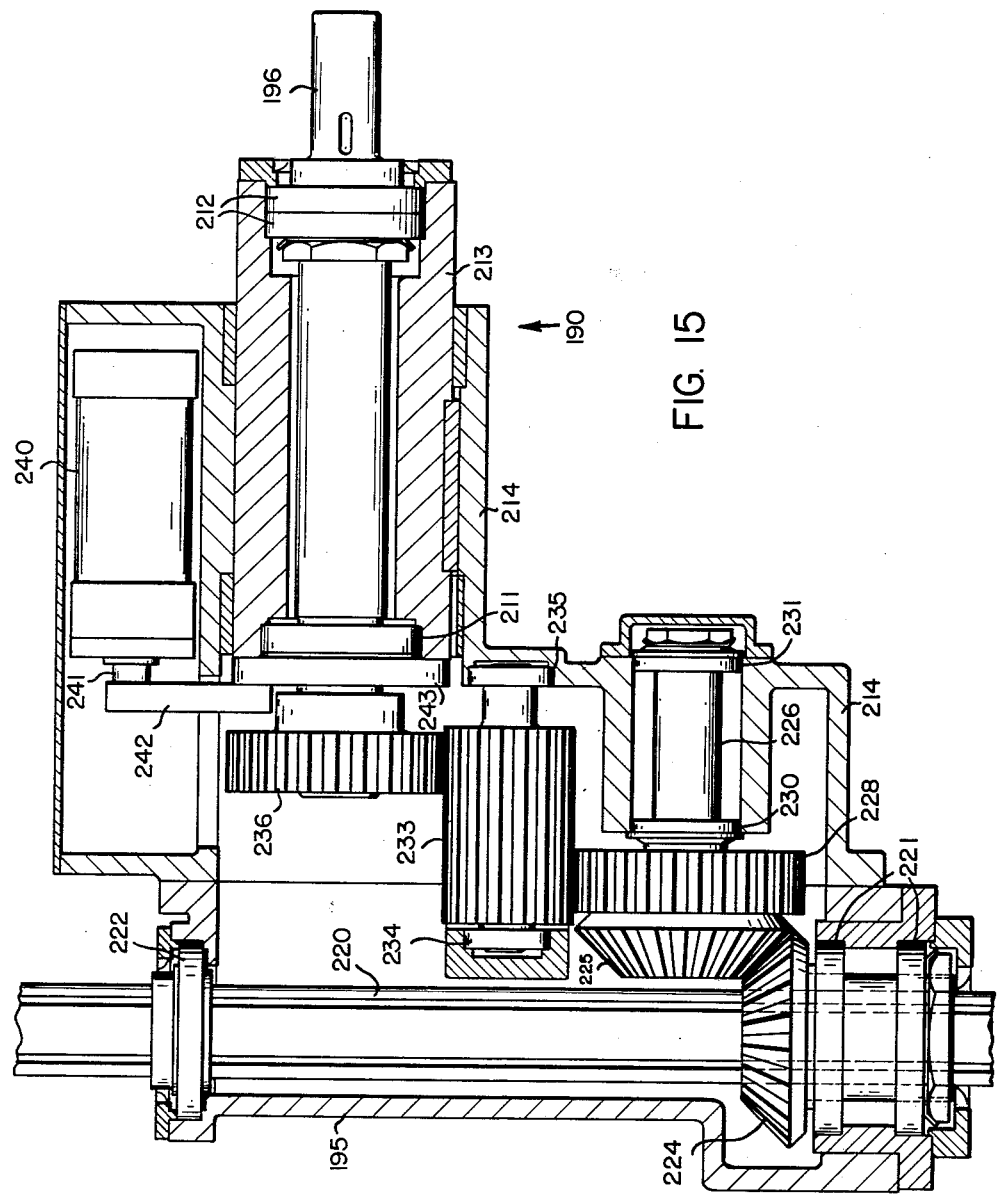
FIG. 15 is a sectional view on an enlarged scale showing the drive to the drill spindle.

When holes are to be drilled or tapped in an end of the workpiece, the end milling cutter and the boring tool are both removed from the machine, and the bridge 191 (FIGS. 1, 2, 13 and 14) and its arm 193 are secured in place as shown in FIGS. 12, 13 and 14, and a drill or tap is secured to spindle 196 (FIGS. 12, 13 and 15). The drill or tap support 195 is power driven, to position the tool at the proper radial position, by motor 198 (FIGS. 13 and 20) which drives screw 210 through the gearing shown in FIG. 20. The tool is, of course, brought into operative relation with the workpiece by movement of saddle 32. When the tool is in operative position, it may be rotated by motor 121 (FIG. 8) which drives spindle 196 (FIG. 15) through bearing 122, 124, 164, 168, 174, 175, 179 (FIG. 8), 184, 186, 100 (FIG. 9), coupling 108, and gearing 224, 225, 233, 236 (FIG. 15). The depth of the hole drilled or tapped is controlled by the piston and cylinder 240 (FIG. 15), piston rod 241 and piston 242. When a hole is drilled or tapped, the tool is backed away by reversal of piston rod 241; and the tool is indexed into position to drill or tap another hole in the face of the workpiece angularly spaced from the hole previously drilled or tapped. Indexing will be effected as previously described by actuating motor 280 (FIG. 7) and engaging clutch 292 with gear 294 and clutch 265 with gear 261. To determine the precise radial position of the drill or tap, pulse generator 205 (FIG. 20) is provided. As before this can be connected in conventional manner to stop screw 210 when a desired movement of support 195 (FIG. 12) has been achieved.

For facing, the boring tool and end mill slide 95 (FIG. 9) and the drill support 195 (FIG. 12) are all removed from the machine; and the facing tool support 302–304 (FIGS. 17, 18 and 19) is mounted on guide way 90. The facing tools 318 are adjusted toward or from one another by manual adjustment of screw 305 (FIG. 17) to place them at the required radial distance apart so that both will engage the work, one at the outside and the other at the inside periphery thereof. After the tools 318 are brought into operative relation with the work by movement of saddle 32, motors 250 (FIG. 7) and 21 (FIG. 8) can be started. Motor 250 will drive tool spindle 85, through the gearing previously described, to cause the tools to revolve about the axis of the tool spindle in engagement with the face of the work; and motor 121 will impart, through gearing 122, 123, 132, 130 (when clutch 133 is engaged), shaft 136, wormwheel 138, end gearing 145, 146, power drive to screw 148, to transmit rectilinear movement to the tools to move them across the face of the workpiece. To control the amount of movement of slide 302–304 in the facing operation, pulse generator 143 (FIG. 8) is provided. Again through conventional mechanism this may stop motor 121 and screw 148 when the tools 318 have completed movement across the surface to be faced. When the facing operation is completed, clutch 133 can be disengaged and clutch 132 is engaged to impart quick return movement to carrier 300 (FIGS. 17, 18 and 19); and saddle 32 can be quick traversed as before back to starting position.

It will be seen from the preceding description, therefore, that a single machine has been provided which can bore, mill, drill, tap, and face, thus achieving a tremendous saving in equipment, in space, in time, and in labor, features of extreme importance for large sized workpieces.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. A machine tool comprising a work support, a tool support, means for selectively rotating said tool support continuously, means for imparting selective rotational indexing movement to said tool support, a slide mounted on said tool support for movement in a direction at right angles to the axis of said tool support, means for effecting movement of said slide during the continuous rotary movement of said tool support, and means for selectively moving said tool support in the direction of its axis during rotation of said tool support.

2. A machine tool comprising a work support, a tool support, means for rotating said tool support continuously, means for imparting rotational indexing movement to said tool support, a slide mounted on said tool support, a shaft journaled in said slide, means for securing a milling cutter to said shaft, means for selectively securing a boring tool fixedly to said slide, and means for moving said tool support in the direction of its axis during continuous rotation of said tool support.

3. A machine tool comprising a work support, a bed, a saddle reciprocable on said bed, a tool spindle rotatably mounted on said saddle with its axis extending horizontally in the direction of reciprocation of the saddle, a slide mounted on said spindle to move rectilinearly diametrally of the axis of said tool spindle, means including an electric motor and gearing mounted in said spindle for moving said slide, and means for rotating said spindle.

4. A machine tool as claimed in claim 3, wherein said spindle rotating means comprises both means for selectively rotating said spindle continuously during movement of said slide through an angle of at least 360°, and separate means for selectively rotating said spindle through a predetermined angle less than 360° to index said spindle.

5. A machine tool comprising a bed, a saddle reciprocable on said bed, a tool spindle rotatably mounted on said saddle with its axis extending horizontally in the direction of reciprocation of said saddle, a slide mounted on said spindle at the front end thereof to move rectilinearly diametrally of the axis of said spindle, a second slide mounted on the first-named slide, means for removably securing a boring tool to the front face of said second slide, a work support for holding a work piece in axial alignment with the axis of said tool spindle, means for adjusting said second slide on said first slide rectilinearly in a direction parallel to the direction of adjustment of said first slide to adjust the position of said tool radially of the axis of said tool spindle, and means for rotating said tool spindle to effect a boring operation on a workpiece mounted on said work support.

6. A machine tool comprising a bed, a work support, a saddle reciprocable on said bed, a tool spindle rotatably mounted on said saddle with its axis extending horizontally in the direction of reciprocation of said saddle, a slide mounted on said spindle at the front end thereof to move rectilinearly diametrally of the axis of said spindle, a second slide mounted on the first-named slide, a shaft journaled in said second slide with its axis extending radially of the axis of said tool spindle, means for removably mounting a milling cutter on said shaft, means for adjusting said second slide rectilinearly on said first slide to adjust the radial distance of said cutter from the axis of said spindle, means for rotating said shaft to effect a milling operation, and means for rotating said spindle to index said cutter to different positions.

7. A machine tool as claimed in claim 6, wherein said spindle is hollow for a portion of its length at least, and said means for rotating said shaft comprises an electric motor mounted within said spindle, and gearing connecting said motor with said shaft.

8. A machine tool comprising a bed, a saddle reciprocable on said bed, a tool spindle rotatably mounted on said saddle with its axis extending horizontally in the direction of reciprocation of said saddle, a slide mounted on said spindle at the front end thereof to move rectilinearly diametrally of the axis of said spindle, a second slide mounted on the first-named slide, a shaft journaled in said second slide with its axis extending radially of the axis of said tool spindle, means for removably securing a boring tool to said second slide in fixed relation thereto, means for removably mounting a milling cutter on said shaft coaxially therewith and at the outer end thereof, means for adjusting said second slide rectilinearly on said first slide to adjust the radial distances of said tool and cutter from the axis of said spindle, work supporting means, means for adjusting said work supporting means to align the axis of a workpiece carried thereby with the axis of said spindle, means for rotating said shaft, means for rotating said spindle, and means for effecting movement of said saddle on said bed during rotation of said spindle.

9. A machine tool as claimed in claim 8, wherein said means for rotating said spindle comprises means for rotating said spindle through an angle of 360° during operation of the boring tool, and separate means for indexing said spindle through an angle for less than 360° to index the milling cutter for milling slots in the workpiece at different angular positions about the axis of the workpiece.

10. A machine tool as claimed in claim 8, wherein said spindle is hollow for a portion of its length at least, and said means for rotating said shaft comprises an electric motor mounted in said spindle, and gearing connecting said motor with said shaft.

11. A machine tool as claimed in claim 10, wherein said means for rotating said spindle comprises means for rotating said spindle through an angle of 360° during operation of the boring tool, and separate means for indexing said spindle through an angle of less than 360° to index the milling cutter for milling slots in the workpiece at different angular positions about the axis of the workpiece.

12. A machine tool comprising a work support, a bed, a saddle reciprocable on said bed, a tool spindle rotatably mounted on said saddle with its axis extending horizontally in the direction of reciprocation of said saddle, a slide mounted on said spindle at the front end thereof, a second slide mounted on said first slide, a shaft journaled in said second slide with its axis extending radially of the axis of said spindle, means for adjusting said second slide on said first-named slide radially of the axis of said tool spindle, a third slide, means for removably mounting said third slide on said tool spindle for movement radially of the axis of said tool spindle, a sleeve reciprocable on said third slide in the direction of the axis of the first-named spindle, a second spindle journaled in said sleeve with its axis extending in the direction of the axis of said first-named spindle, means for mounting a rotary tool on said second spindle, means for rotating said shaft, means for coupling one end of said shaft to said second spindle to rotate said tool, means for effecting movement of said third slide on said first-named spindle, means for moving said sleeve axially to effect depthwise feed of a tool mounted on said second spindle, and means for rotating said first-named spindle to index said tool to different positions relative to a workpiece carried by said work support.

13. A machine tool as claimed in claim 12 wherein means is provided for removably mounting a milling cutter on the other end of said shaft.

14. A machine tool as claimed in claim 12 wherein said first-named spindle is hollow, said means for rotating said shaft comprises an electric motor mounted in said first-named spindle, and gearing connecting said motor with said shaft, and said means for effecting movement of said third slide comprises a motor mounted thereon, and means including a screw driven thereby, and a nut fixed relative said first-named spindle.

15. A machine tool comprising a work support, a bed, a saddle reciprocable on said bed, a tool spindle rotatably mounted on said saddle with its axis extending horizontally in the direction of reciprocation of said saddle, a slide reciprocably mounted on the front end of said spindle for movement diametrally of the axis of said spindle, a pair of supporting members, means for mounting a facing tool on each of said members, means for removably supporting one of said members on said slide for adjustment parallel to the direction of movement of said slide, means for supporting the other of said members on said one member for adjustment relative to said one member in the direction of adjustment of said one member to adjust said tools toward and from one another radially of the axis of said spindle, a work support, means for mounting a workpiece on said work support with its axis aligned with the axis of said tool spindle, means for rotating said tool spindle, and means for simultaneously moving said slide on said spindle.

16. A machine tool as claimed in claim 15 wherein said spindle is hollow, and said means for moving said slide on said spindle comprises an electric motor mounted in said tool spindle, and gearing connecting said motor with said slide.

17. A machine tool comprising a bed, a saddle reciprocable on said bed, a housing secured to said saddle to project therefrom, a hollow tool spindle rotatably mounted in said housing with its axis extending in the direction of movement of said saddle, means mounted on said saddle for imparting rotation to said spindle through 360°, means mounted on said saddle for rotating said spindle through an angle of less than 360° to index said spindle, a first slide mounted on the front end of said spindle for movement in a direction radial of the axis of said spindle, means including an electric motor mounted in said spindle, a screw, a nut secured to said first slide, and gearing connecting said motor to said screw for moving said first slide on said spindle, means for removably mounting a second slide on said first slide for movement in a direction parallel to the direction of movement of said first slide, a shaft journaled in said second slide, means including said motor and gearing connecting said motor with said shaft for rotating said shaft, means for removably mounting a milling cutter on one end of said shaft, means for removably mounted a boring tool on said second slide, a third slide, means for removably mounting said third slide on said spindle, a sleeve reciprocable in said third slide in a direction parallel to the axis of said spindle, a second spindle journaled in said sleeve with its axis extending in the direction of reciprocation of said sleeve, means for removably mounting a drilling or tapping tool on said second spindle, means for coupling the other end of said shaft to said second spindle to rotate said second spindle, means for moving said third slide on the first-named spindle in a direction radial of the axis of said first-named spindle comprising a second motor mounted on said third slide, and a second screw and a second nut meshing therewith, and gearing connecting said second motor with said second screw, said second nut being fixed relative to said first-named spindle, means for moving said sleeve axially to effect depthwise feed of a tool mounted on said second spindle, means for removably mounting on said third slide a support for a facing tool, a work support, and means for adjusting a workpiece horizontally and vertically on said work support to align the axis of the workpiece with the axis of said first-named tool spindle, and means for adjusting said work support through an angle of 180° about an axis perpendicular to the axis of said tool spindle.

18. A machine tool comprising a rotary support, means for removably mounting a milling cutter shaft and means for removably supporting a boring tool on said support for adjustment radially of the axis of said support, means for removably mounting a second shaft on said support with its axis extending in the direction of the axis of said support, means for removably mounting a drilling tool on said second shaft, means for removably mounting a facing tool on said support, means for adjusting the positions of said boring tool and milling cutter radially of said support, a work support, means for rotating said rotary support whereby, while a boring tool is mounted thereon, to effect a boring operation on a workpiece carried by said work support, means for rotating the first-named shaft to effect a milling operation on the workpiece, means for adjusting said second shaft radially of the axis of said rotary support to adjust the axis of the drilling tool radially of said rotary support, means for rotating said second shaft, means for indexing said rotary support on its axis to position said milling cutter and drilling tool for operations at different angular positions about the axis of the workpiece, means for mounting a facing tool on said rotary support, and means for moving said facing tool radially of said rotary support while said rotary support is being rotated, thereby to effect a facing operation on the workpiece.

References Cited in the file of this patent
UNITED STATES PATENTS

| | | |
|---|---|---|
| 396,987 | Corliss | Jan. 29, 1889 |
| 2,269,641 | Woytych | Jan. 13, 1942 |
| 2,283,323 | Erhardt | May 19, 1942 |
| 2,301,171 | Morton | Nov. 3, 1942 |
| 2,851,910 | Zwick | Sept. 16, 1958 |